Nov. 5, 1963   C. B. ROGERS   3,109,321
BALANCER FOR A ROTATING SHAFT
Filed Sept. 19, 1961   2 Sheets-Sheet 1
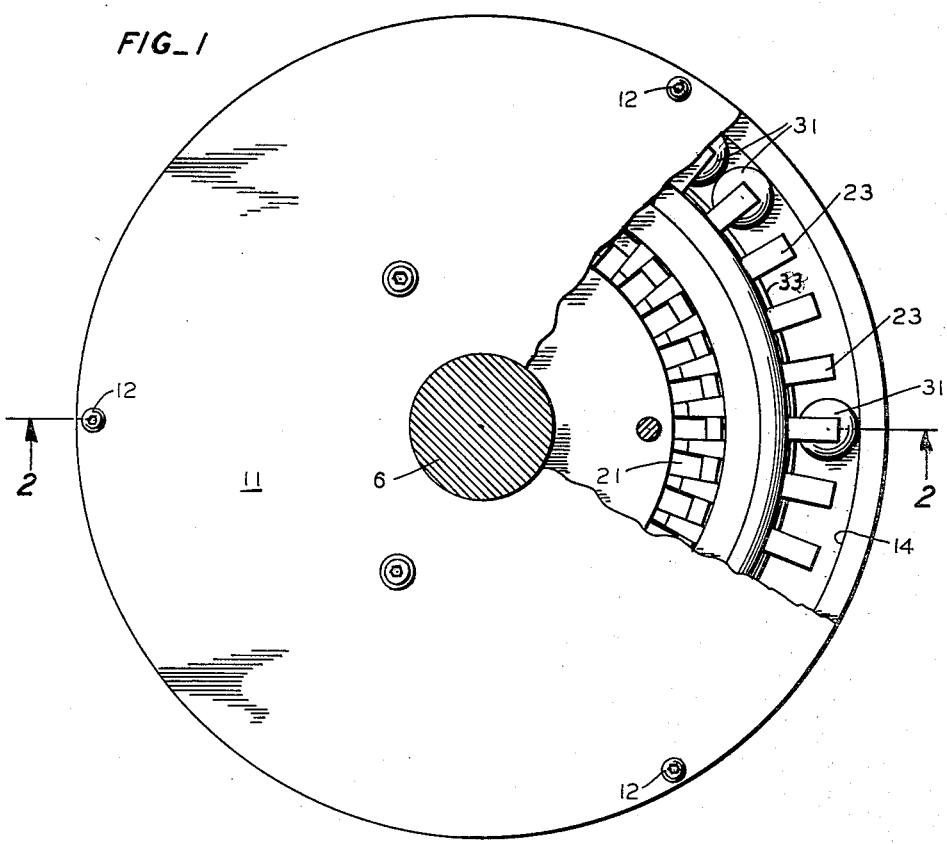
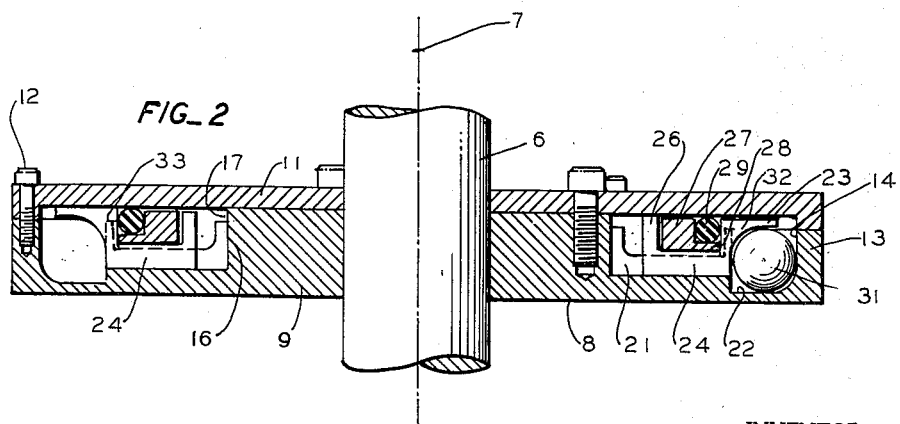
INVENTOR.
CECIL B. ROGERS
BY *Lothrop & West*
ATTORNEYS Nov. 5, 1963
C. B. ROGERS
3,109,321
BALANCER FOR A ROTATING SHAFT
Filed Sept. 19, 1961
2 Sheets-Sheet 2
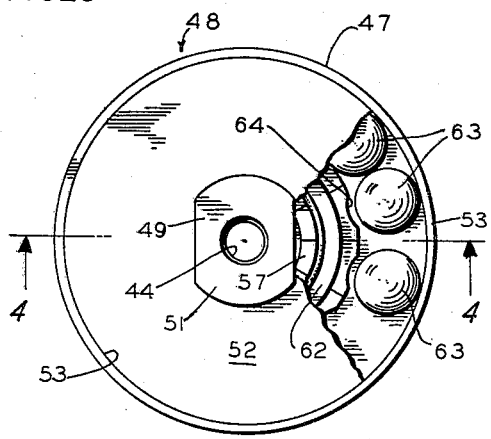
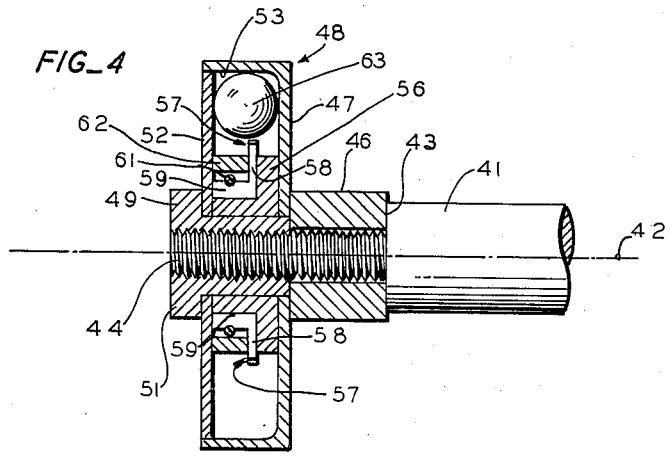
INVENTOR.
CECIL B. ROGERS
BY Lothrop & West
ATTORNEYS

United States Patent Office 3,109,321
Patented Nov. 5, 1963

3,109,321
BALANCER FOR A ROTATING SHAFT
Cecil B. Rogers, 701 Heinz Ave., Berkeley, Calif.
Filed Sept. 19, 1961, Ser. No. 139,235
5 Claims. (Cl. 74—573)

My invention relates to means especially useful in connection with unbalanced rotating objects such as rotating shafts and is designed to correct in an automatic manner the unbalance existing in the shaft.

In many instances rotating shafts, which are considered herein to include in general all types of rotating machinery, have unbalance which can be corrected by proper positioning of weight in one plane of rotation of the shaft. My balancer is designed to be easily installed upon the shaft and automatically, as the shaft rotates, to correct the unbalance either partially or entirely. Although not limited thereto an instance of such an environment is the rotary crank shaft of an engine; for example, a one cylinder reciprocating gas engine. As manufactured these often have residual unbalance which it is possible to correct by the proper positioning of counter weights in the proper polar location and in a single plane. The device can also be attached by lugs to an automobile wheel, for example, or even within an automobile tire in an axially centralized position. Reference to shaft mounting herein is intended to include these.

It is therefore an object of my invention to provide a balancer for ready installation on a rotating shaft and effective automatically to correct unbalance in the shaft and its pertinent rotating mechanism.

Another object of the invention is to provide a balancer which can easily be installed and detached and which when installed will improve the balance condition of the shaft.

Another object of the invention is in general to provide a relatively simple but effective balancer.

Another object of the invention is to provide a balancer which is automatic in its operation.

Other objects together with the foregoing are attained in the embodiments of the invention described in the accompanying description and illustrated in the accompanying drawings in which:

FIGURE 1 is an end elevation of one form of balancer constructed in accordance with the invention, a portion of the balancer casing being broken away to disclose the interior construction.

FIGURE 2 is a cross section the plane of which is indicated by the line 2—2 of FIGURE 1.

FIGURE 3 is an end elevation of another form of balancer pursuant to the invention a portion of the balancer casing being removed to disclose the interior arrangement.

FIGURE 4 is a cross section the plane of which is indicated by the line 4—4 of FIGURE 3.

While the balancer of the invention can be installed in various different environments and is subject to embodiment in a number of different ways it has successfully been employed as shown herein. In this installation, there is afforded a rotating shaft 6 which is generally symmetrical and rotates about a shaft axis 7. The shaft 6 is considered to have substantial unbalance when rotating.

Mounted on the shaft for rotation therewith and against rotation with respect thereto; for example, by means of threads or bolts (not shown) or by means of a tight press fit (as shown), is a balancer casing 8 including not only a base portion 9 but also a removable cover disc 11 normally held in place by appropriate fastening bolts 12. The casing 8 is made with a peripheral rim 13 having a circular cylindrical inside face 14 and is also provided with a central hub 16 having a circular cylindrical face 17 confronting the face 14. Both of the surfaces 14 and 17 are concentric with respect to the axis 7. The casing base 9 is contoured to afford a plurality of radial slots 21 ranging most of the distance between the hub 16 and the rim 13 except for a relatively deep peripheral groove 22 at the outer ends of the slots.

Designed to move radially in the various slots 21 are fingers 23 of somewhat S shaped configuration. The inner portion 24 of each finger has a sliding fit in a respective one of the slots 21 and has an upstanding inner projection 26.

Encompassing all of the projections 26 and lying against the fingers 24 is a ring 27. This is not confined except by the fingers and the casing cover 11. The ring 27 has a flange 28 underlying a spring 29, in this instance taking the form of a rubber O-ring.

Adapted to roll against the rim 13 or race is one or a plurality of balls 31 of an appropriate size to roll peripherally against the surface 14 without restriction when the fingers are in their radially inward retracted position but being large enough to be blocked by forward extensions 32 on each of the fingers when the fingers are in their radially outward extended position.

The number of balls 31 in the casing and their weight is such that the balls are available to produce a substantial counter balancing effect but are few enough so that there is a wide range of angular free movement for them. As an example, three or four or five balls are utilized in the customary instance.

While the detailed theory of operation of this structure is not entirely understood it appears under actual examination by stroboscope that when installed as indicated and when the shaft 6 rotates rapidly about the axis 7 any unbalance in the mechanism associated with the shaft 6 causes slight vibratory motion of the shaft in a radial direction. The casing 8 cannot move radially with respect to the shaft 6, being tightly pressed thereon. But the ring 27 is quite free to move radially within a reasonable limitation. It appears that the ring 27 shifts bodily in a radial direction in response to unbalance.

The transfer or radial shifting of the ring 27 is accompanied by a corresponding displacement of the adjacent fingers 23. The ring 27 and its flange 28 abut the projections 26 and the adjacent extensions 32 of the fingers and displaces them radially between their inward position and their outward position. In the outward position of the finger or fingers the passageway for the balls 31 is too small to permit the balls to move peripherally. Motion of the balls into and accumulation of balls in a blocked portion of the structure is impossible but the remaining portion of the device is entirely free for accumulation of the balls in an appropriate location of the rotating element. Under some conditions, the metal ring 27 can be omitted. The fingers then are controlled solely by the spring or O-ring 29 which permits the fingers to fly out radially and trap the ball or balls in a balance position.

It is observed that the vibration of a rotating structure is sufficiently varied when it is unbalanced as to cause a complex motion of the ring 27 on various radii so that the balls 31 tend to be located and at least momentarily held in the instantaneously appropriate position to make up the deficient weight on the light side of the rotary member. It is believed that the compensating movements of the ring, fingers and balls follow regular but complex paths. These appear to be random and are sometimes so designated although a mathematical motion analysis may develop set formulae. In any case, the actual result is that much or all of the unbalance is instantaneously corrected so that the device tends to run considerably smoother and without vibration whereupon the ring 27 tends to assume more nearly a concentric location. As soon however as any unbalance manifests itself during rotation the described action repeats itself until the device again becomes quiet. Such re-correction occurs more particularly when the degree of new unbalance creates a vibrating force greater than the centrifugal force acting to restrain the movable weight through the described means.

Conveniently the spring or O-ring 29 acts partially as a cushion to restrain excessive radial movement of the ring 27 and for that purpose the casing base 8 is provided with an upstanding flange 33 to serve as an abutment to block excessive outward movement. After some compression of the ring 29 the flange 28 on the ring 27 comes into metallic contact with the flange 33 and thus the ring is prevented from going too far outwardly.

In a somewhat simpler form of device especially for use on any rotating object such as the crank shaft of a single cylinder gasoline engine an arrangement as shown in FIGURES 3 and 4 is afforded. In this instance the engine crank shaft 41 is generally rotatable about an axis 42. The shaft has a standard shoulder 43 and a threaded end 44. Pursuant to the invention a spacer 46 is sometimes disposed against the shaft 43 around the extension 44 and the base portion 47 of a casing 48 is mounted against the spacer 46. A securing nut 49 is likewise threaded upon the extension 44 and serves as a hub for the casing base 47. The nut also has any suitable noncircular head 51 that can be screwed tightly into abutment with the cover 52 of the casing 48 to provide an appropriate enclosure.

The casing 48 has a peripheral rim 53, as before and likewise is provided with a central coaxial or concentric hub 56, in this instance a separate piece. The hub serves as a mounting for a plurality of separate L shaped fingers 57 each of which has a relatively flat radial portion 58 and an upstanding axial portion 59 arcuate in plan. The fingers 57 are lightly restrained against radial movement from an inwardly retracted position to an outwardly extended position by a surrounding spring 61 such as a rubber O-ring or the like contacting the upstanding portion 59.

Resting between the cover 52 and the radial portions 58 of the fingers is a free ring 62 which occupies an approximately concentric position but is free to move radially in response to unbalanced forces. Positioned within the casing and designed to roll around the inner portion of the rim 53 is a plurality of balls 63.

In this instance, when the shaft 41 is rotated about the axis 42 and when unbalance therein exists the tendency of the ring 62, since the casing itself cannot move radially on the shaft, is to shift radially. This shifting movement of the ring also permits some of the fingers 57 to move in a radial direction far enough to block the pathway of the balls 63 so that such balls cannot move into an adjacent position against the rim 53. Thus the balls are located on the proper side of the casing. The unbalance in this manner is compensated for so that the shaking or shifting of the structure decreases and the ring 62 tends to return more nearly to a centralized position. Any reintroduction of the unbalance, however, causes a similar operation of the appropriate parts of the structure so that in general operation the unbalance is appropriately corrected and the rotation proceeds smoothly.

Under some conditions of operation, it is appropriate to have each of the fingers 57 made with a plain arcuate extremity to serve as a blocking means for the balls, but in some instances, the fingers 57 are formed with arcuate peripheral contours in the shape of scallops 64 so that, even though the fingers are wide, the balls can be blocked in intermediate positions.

It will be understood that terms descriptive of parts of the exemplary embodiments of the invention herein shown and described are used in the generic sense and without intent of limitation to specific structure, as for example the expression "ball" contemplates rolling and sliding bodies other than spherical and the term "fingers" contemplates any suitable radially shiftable mass or body.

My invention is not limited to the particular embodiments thereof illustrated and described herein, and I set forth its scope in my following claims:

What is claimed is:

1. A balancer for a rotating shaft having an axis comprising a casing having a rim, means for mounting said casing on said shaft with said rim concentric with said axis, a concentric hub within said casing, a plurality of fingers in said casing between said hub and said rim and radially movable between an outwardly extended position and an inwardly retracted position, a ball in said casing adapted to roll against said rim in a circumferential direction free of said fingers in retracted position but blocked by said fingers in extended position, and a radially movable ring in said casing surrounding said hub and moving radially with movement of said fingers.

2. A balancer for a rotating shaft having an axis comprising a casing having a rim, means for mounting said casing on said shaft with said rim concentric with said axis, a plurality of fingers in said casing radially movable between an outward position and an inward position, a ball in said casing adapted to roll against said rim in a circumferential direction free of said fingers in said inward position but blocked by said fingers in said outward position, and a radially movable ring in said casing and engaged with said fingers for radial movement with said fingers.

3. A balancer for a rotating shaft having an axis comprising a casing having a rim, means for mounting said casing on said shaft with said rim concentric with said axis, a ball in said casing adapted to roll circumferentially on said rim, a finger in said casing and movable radially thereof into and out of the path of movement of said ball, means for urging said finger out of said path, and a ring in said casing surrounding said axis and movable radially to control radial movement of said finger.

4. A balancer for a rotating shaft having an axis comprising a casing having a rim, means for mounting said casing on said shaft with said rim concentric with said axis, a ball in said casing adapted to roll circumferentially on said rim, a plurality of fingers, means for mounting said fingers in said casing for radial movement into and out of the circumferential path of said ball, means for urging said fingers out of said path, and a ring in said casing surrounding said axis and engageable with said fingers for controlling radial movement of said fingers.

5. A balancer for a rotating shaft having an axis, said balancer comprising a casing having a rim, means for mounting said casing on such shaft with said rim concentric with the axis thereof, a circumferentially movable weight within said casing in guided contact with said rim, radially movable weight-engageable means and radial guides therefor in said casing, said latter means normally disposed inwardly from the path of said weight on said rim and being centrifugally movable outwardly into weight-engaging relation in said path for restraining circumferential movement of the weight upon increase in rotational speed of the casing, and annular means in said casing and surrounding the shaft axis and uniformly operative at all points about it to yieldably oppose centrifugal force acting upon said radially movable means so as to restrain the latter against outward movement at lesser rotational speed of the casing thereby to free said weight for automatically moving circumferentially of the casing rim into appropriate position thereabout for compensating unbalance of the shaft at any given rotational speed thereof and whereby said weight occupies such compensating position when it is engaged by said radially movable means in response to casing speed increase.

References Cited in the file of this patent
UNITED STATES PATENTS 2,331,756    Zobel _____ Oct. 12, 1943

FOREIGN PATENTS 1,202,949    France _____ July 27, 1959